United States Patent [19]
Barsi et al.

[11] Patent Number: 5,601,209
[45] Date of Patent: Feb. 11, 1997

[54] SEED METERING APPARATUS

[75] Inventors: Barry B. Barsi; Lawrence S. J. Grodecki, both of Yorkton, Canada

[73] Assignee: Morris Industries, Ltd., Saskatchewan, Canada

[21] Appl. No.: 500,193

[22] Filed: Jul. 10, 1995

[51] Int. Cl.$^6$ .................................................. B65H 3/06
[52] U.S. Cl. ............................ 221/266; 111/179; 111/182
[58] Field of Search .................................. 221/266, 278, 221/211, 82; 111/177, 178, 179, 180, 181, 182

[56] References Cited

U.S. PATENT DOCUMENTS

| | | | |
|---|---|---|---|
| 3,048,132 | 8/1962 | Morgan et al. | 221/266 |
| 4,037,755 | 7/1977 | Reuter | 221/211 |
| 4,047,638 | 9/1977 | Harrer et al. | 221/278 |
| 4,074,830 | 2/1978 | Adams et al. | 221/266 |
| 4,094,444 | 6/1978 | Willis | 221/266 |
| 4,241,899 | 12/1980 | Harrer | 221/266 |
| 4,306,509 | 12/1981 | Hassan et al. | 111/179 |
| 4,496,075 | 1/1985 | Ray | 221/266 |
| 4,500,017 | 2/1985 | Machnee . | |
| 4,519,525 | 5/1985 | Wunschl et al. . | |
| 5,170,909 | 12/1992 | Lundie et al. . | |

*Primary Examiner*—William E. Terrell
*Assistant Examiner*—T. Kelly
*Attorney, Agent, or Firm*—Hovey, Williams, Timmons & Collins

[57] ABSTRACT

The seed metering method and apparatus utilizes a bank of individual metering discs within a pressurized singulating chamber wherein the seed cups around the peripheral edge of each disc are communicated with an air exhaust port through internal passages in the discs, thus, causing the seeds to cling to the seed cups as the discs rotate upwardly through the collection of seeds from the pressurized tank. As the seeds reach the far side of their circular path of travel on the discs, the access of the seed cups to the exhaust ports is terminated, allowing the seeds to release from the discs and drop into strategically located ventures associated with powerful conveying air streams. The ventures have the effect of sucking the released seeds instantly into the air streams so that the regular seed spacing established by the metering discs is maintained as the seeds enter the air transferring portion of the system. Once within the transfer streams and under their powerful control, there is no reason for the seeds to become disoriented or agitated, and they travel smoothly and in an orderly manner to their ultimate points of insertion into the ground. Valve plates interspersed between the adjacent discs serve to alternately permit and deny access of the pressurized seed discs to the exhaust areas of the equipment.

17 Claims, 9 Drawing Sheets

SEED METERING APPARATUS

TECHNICAL FIELD

This invention relates to the field of seed metering for drills and planters and, more particularly, to a metering system which is designed to work with an air seeder that separates seeds from a mobile bulk supply thereof into a plurality of separate seed streams, each containing seeds spaced at regular intervals for delivery by air conveyance streams to remote openers.

BACKGROUND

Air seeders for metering a flow of seeds out of a bulk supply hopper and into conduits that deliver the seeds to remotely located openers are not new. However, this practice has largely been limited to seeds other than corn seeds where uniform seed spacing is critical to achieving satisfactory yield results. It is very difficult to maintain uniform spacing between individual seeds with an air seeder, especially when the seeds must be conveyed over long distances. However, the economies of scale achievable with the bulk handling and metering of corn seeds remain extremely attractive and give rise to a serious long-felt need to solve the problems heretofore experienced in the industry.

SUMMARY OF THE PRESENT INVENTION

Accordingly, a primary object of the present invention is to fill the long-felt need in the industry for a commercially acceptable way of air-seeding corn. Another important object of the present invention is to provide an air seed metering and distribution system that is capable not only of accurately and reliably singulating the seeds contained in a bulk supply hopper, but also of maintaining the established spacing between the seeds as they are conveyed over fairly substantial distances to their ultimate points of insertion into the ground. It is also an important object to provide a relatively compact metering device which, notwithstanding its relative compactness, is capable of handling a large quantity of seeds. It is also important in this respect to provide a metering device which can be readily expanded by the manufacturer as may be necessary or desirable to add additional runs of seed conveying hoses for additional rows of seeds to be planted. Significantly, it is also an important object of the present invention to provide a system which enables the farmer to make more efficient use of this existing equipment, that is, to use a single piece of equipment for multiple tasks such as, for example, field cultivation, corn planting, wheat drilling, and fertilizer application.

In carrying out the foregoing and other important objects of the invention, it is contemplated that the seed metering device will have at its heart a bank of side-by-side metering discs arranged at the dispensing outlet of the seed hopper for receiving a supply of seeds from the hopper. A corner or quadrant of each disc rotates through the collection of seeds from the hopper so that cups formed around the periphery of each disc can pick up and retain one seed each as the cups sweep through the seeds. The hopper is pressurized and the seed cups are exhausted to the atmosphere during their seed pick up and retaining cycle so that the seeds are encouraged to hold onto the periphery of the disc once engaged by a cup. The cups are so shaped and dimensioned as to encourage the pick up of only one seed per cup.

At a subsequent point in their cycle of rotation, the seed cups are cut off from the pressurized tank such that the seeds drop off the discs. At that point, they are drawn into separate transfer lines by individual ventures associated with such lines, whereupon the positive pressure air streams within the lines convey the singulated seeds to the awaiting downstream openers without disrupting the spacing achieved by the singulating action of the discs.

DETAILED DESCRIPTION

Figure 1:
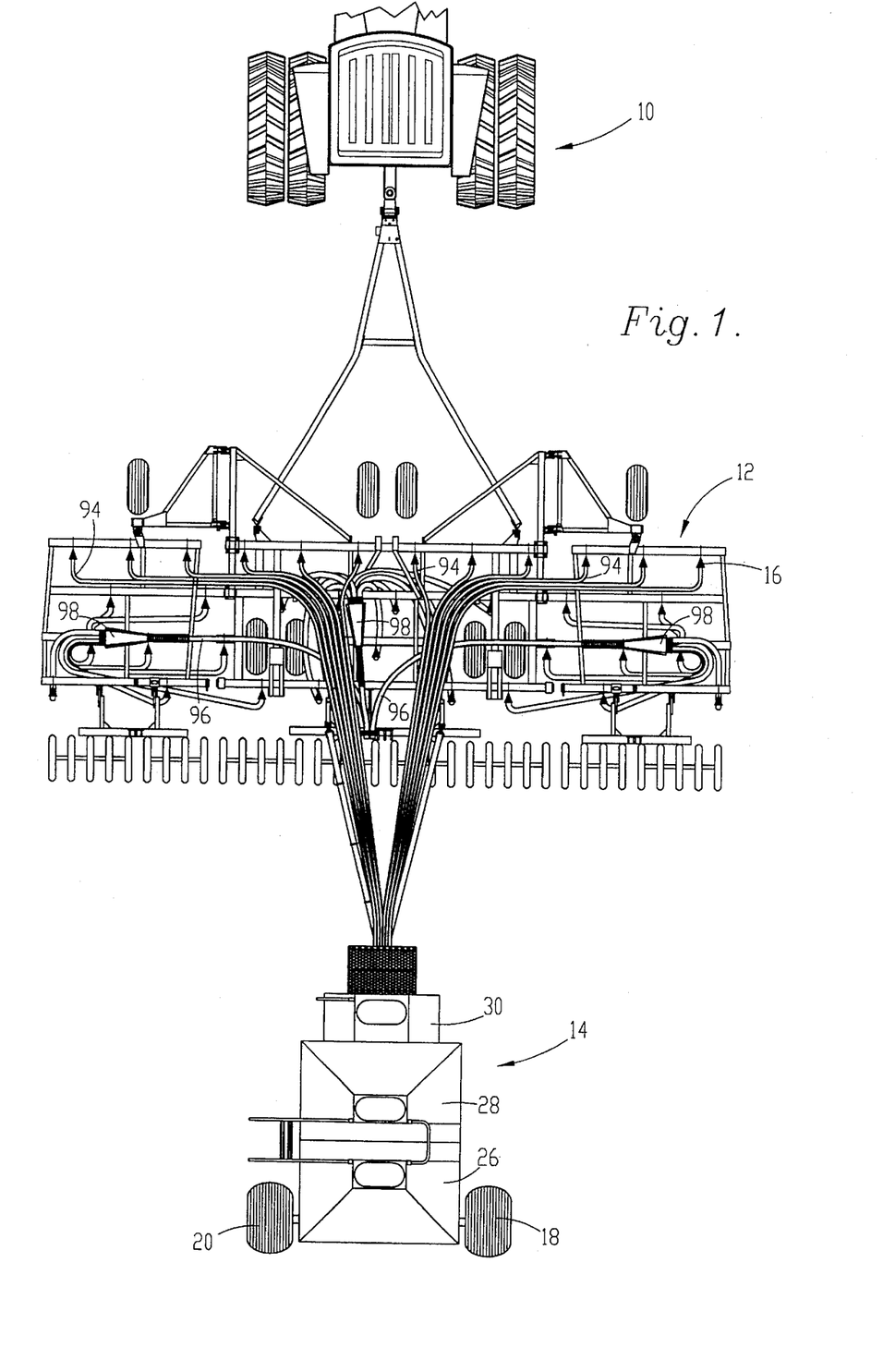
FIG. 1 is a schematic, fragmentary top plan view of an air seeding system incorporating the novel metering and distribution method and apparatus of the present invention.

FIG. 1 illustrates an air seeding rig of the type which may advantageously be used in connection with the present invention. The rig includes a towing tractor 10, a field cultivator 12 hitched to the tractor 10 and modified for planting operations, and a bulk seed cart 14 hitched to the rear of the cultivator 12. Most of the details of the present invention are associated with the seed cart 14 which carries mechanism for accurately separating the bulk supply of seeds into a series of individual seed streams containing seeds at regular, spaced intervals. The cart 14 has the ability to convey the singulated seeds of each stream to the modified field cultivator 12 where the seeds are placed in the ground by suitable openers 16 as the rig is advanced. A number of different types of openers 16 could be utilized in conjunction with the present invention and are well known to those skilled in the art.

Figure 2:
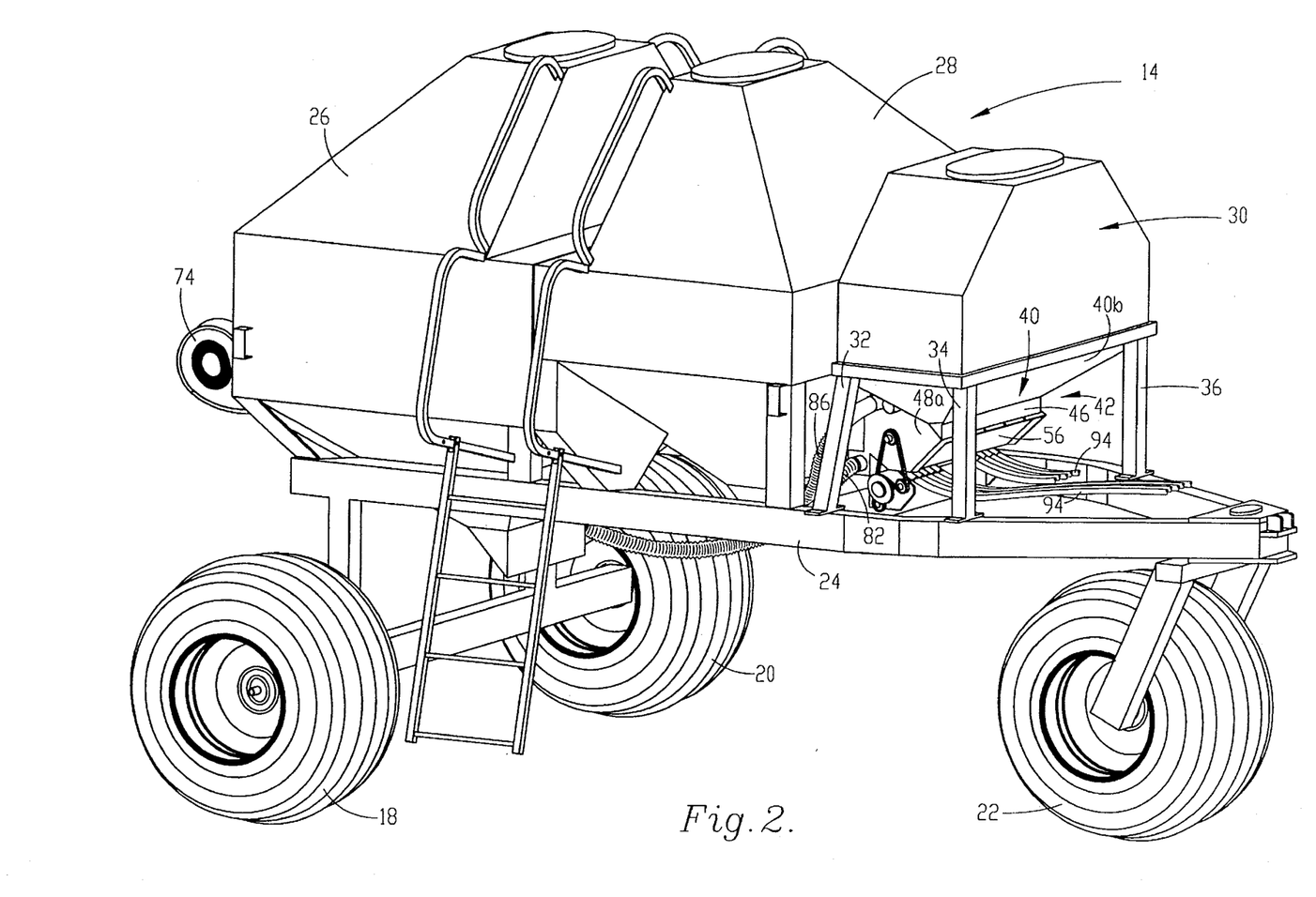
FIG. 2 is an enlarged right front isometric view of a bulk seed and fertilizer hopper cart utilized in connection with the present invention.

As illustrated in FIGS. 1 and 2, the cart 14 has ground wheels 18, 20 and 22 that support a frame 24 above the ground. The frame 24, in turn, carries a large fertilizer tank 26 and a large wheat seed tank 28.

Figure 3:
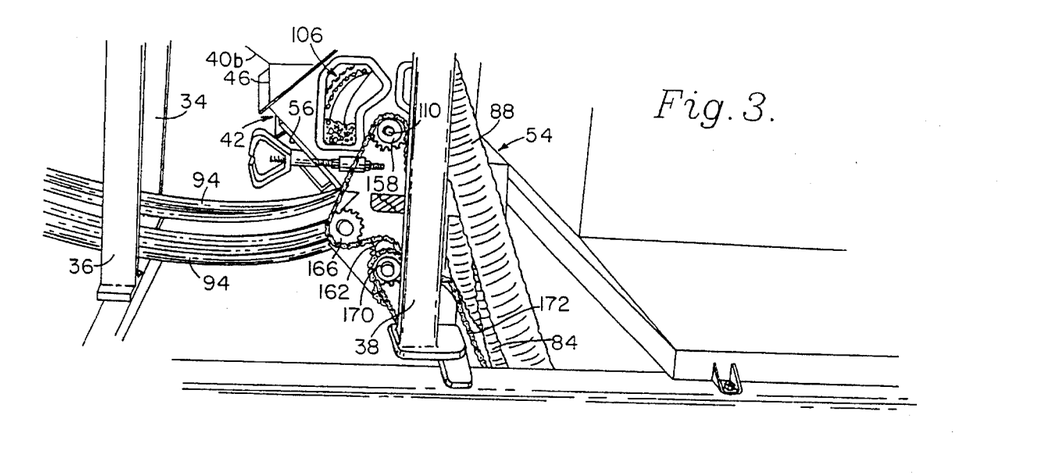
FIG. 3 is an enlarged, fragmentary left front perspective view of a metering device on the cart of FIG. 2.
Figure 4:
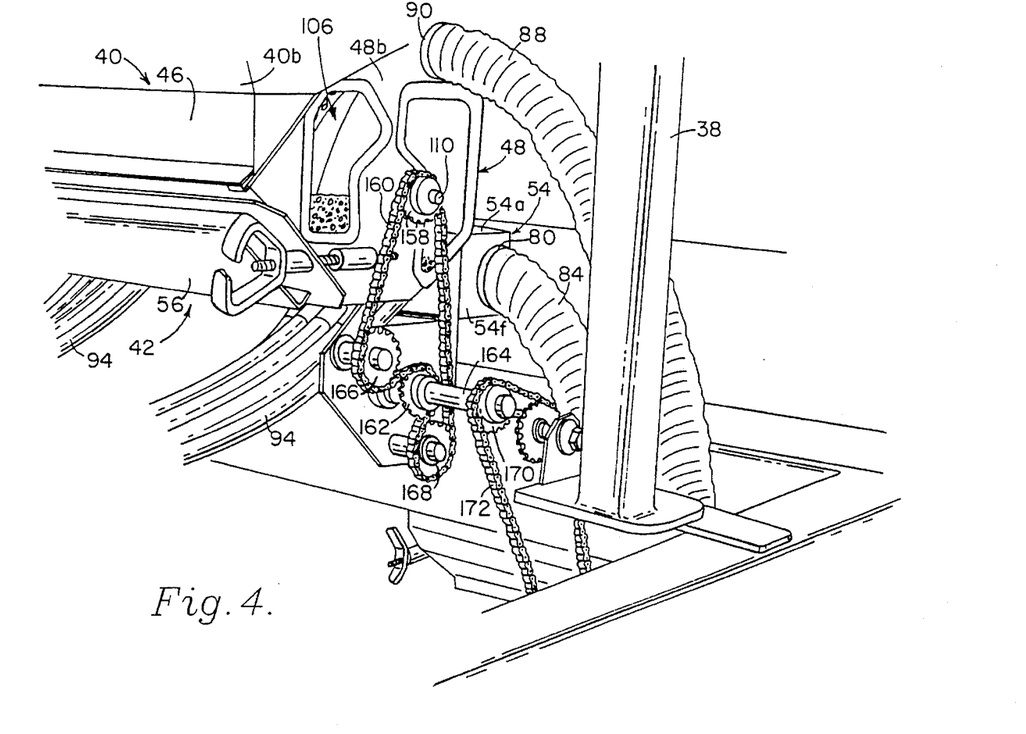
FIG. 4 is a slightly further enlarged left front perspective view thereof taken from a slightly different angle than FIG. 3.
Figure 5:
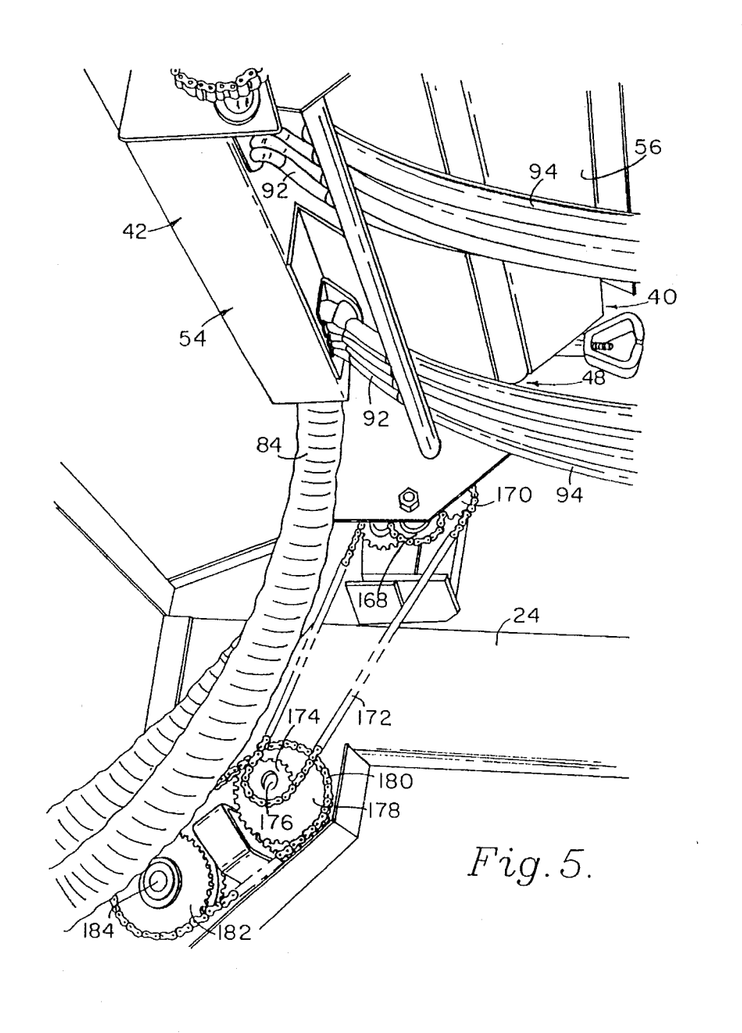
FIG. 5 is a fragmentary, enlarged right front perspective view of the metering device taken from beneath the device and looking upwardly at the transfer conduits leaving the device and illustrating some of the drives for the device on the far left side of the machine.

A smaller corn seed tank 30 is supported above the frame 24 by four upright legs 32, 34, 36 and 38 (see also FIGS. 3 and 4). The lower portion of the corn tank 30 comprises a discharge funnel 40 that hangs down into the open space between the legs 30–38 for the purpose of supplying seeds to a metering and distribution device 42 constructed in accordance with the principles of the present invention. The sloping rear wall 40a (FIG. 6) of the funnel 40 closes off most of the top of the metering device 42 so that a relatively small outlet 44 (FIG. 6) is presented by the funnel 40 for releasing seeds into the metering device 42. The sloping front wall 40b of the hopper 40 terminates at the upper extremity of the outlet 44 and merges into a short, rectangular, upright front panel 46.

The metering device 42 includes a housing or hollow body 48 that is attached to and suspended from the funnel 40 of the corn tank 30. The body 42 is partitioned into three distinct chambers, namely a relatively large, main chamber 50 in which seeds are singulated, an overhead plenum chamber 52 above the singulating chamber 50, and a lower, rear manifold chamber 54 for supplying conveying air after the seeds have been singulated into separate streams. Dealing first with the singulating chamber 50, it will be seen that the laterally spaced, opposite side walls 48a and 48b of the body 48 serve as opposite lateral boundaries of the chamber 50. An upright rear wall 48c of the body 48 (FIGS. 6 and 10) defines the back limit of the chamber 50, while a removable access door 56 (FIG. 4) across the front of the body 48 defines the front limit of the chamber 50. The access door 56 is removed in FIGS. 8 and 10 to reveal details of construction. The top of the chamber 50 is defined by the rear wall 40a of the funnel 40.

The body 48 has a pair of transverse, L-shaped channels 58 and 60 which span the side walls 48a and 48b generally at the intersection of the downwardly and forwardly sloping top of the body and the upwardly and forwardly sloping front of the body. The two channels 58 and 60 are spaced apart along a fore-and-aft incline by an amount corresponding to the width of the outlet 44 from the funnel 40 such that the space between the channels 58 and 60 serves as a seed inlet 62 into the singulating chamber 50. It is to be understood that the inlet 62 extends entirely across the full width of the metering body 48 from side wall 48a to side wall 48b.

The plenum chamber 52 is generally triangular in cross-sectional configuration and has its opposite ends defined by upper portions of the two side walls 48a and 48b so that the chamber 52 extends along the full width of the singulating chamber 50. The rear of the plenum chamber 52 is defined by an upwardly and forwardly extending rear wall 64, while the floor of the plenum chamber 52 is defined by a horizontal partition 66 having an upturned front flange 66a. The front flange 66a is perforated to present a series of air inlet holes 68 corresponding in number to the number of metering discs contained within the singulating chamber 50 as will hereinafter be described. The plurality of holes 66 could also take the form of a single slot or other opening. A pair of main inlet apertures 70 and 72 are provided in the side wall 48a for supplying pressurized air from a source such as the fan 74 in FIG. 2 to the plenum chamber 52.

The manifold Chamber 54 is rectangular in cross-sectional configuration and extends across the full width of the metering body 48 at the lower rear corner thereof. The manifold chamber 54 has a closed top wall 54a, a closed back wall 54b, a closed bottom wall 54c and a front wall 54d that is closed except for a series of orifices 76 disposed along the length of chamber 54. There is one orifice 76 for each metering disc within the singulating chamber 50. The opposite end walls 54e and 54f have air inlets 78 and 80 respectively for connection to a source of high pressure air.

As shown in FIGS. 2–5, a hose 82 from a source of high pressure air communicates with the inlet 78 of the manifold 54, while a second hose 84 from the high pressure source is coupled with the inlet 80 at the opposite end of the manifold 54. Another pair of hoses 86 (only one being shown) are connected with the inlet apertures 70 and 72 to the plenum chamber 52, while at least one additional hose 88 from the high pressure source is connected with the plenum chamber 52 via an inlet aperture 90 (FIG. 4) in the side wall 48b of the plenum chamber 52.

The orifices 76 of the manifold 54 communicate with a series of corresponding conduit fittings 92 corresponding in number to the orifices 76 and projecting downwardly and forwardly from the manifold 54. Each fitting 92 is coupled at its forward end with a flexible conduit 94 which extends forwardly therefrom and leads to a corresponding opener 16 on the field cultivator 12. In the illustrated embodiment (FIG. 1) a total of twelve "runs" of the conduits 94 is contemplated for delivering seeds to the front row of openers on the field cultivator 12. Other openers in the rows behind the front row may be conveniently utilized to put down dry fertilizer from the tank 26, or wheat seeds or the like from the tank 28. For this purpose, a plurality of additional, larger diameter hoses 96 and flat fan distributors 98 are utilized.

Each of the fittings 92 has a restricted portion 92a through which the air flow from manifold 54 must pass in order to reach the conduit 94. Thus, the restriction 92a presents a venturi 100 within each fitting 92 that results in an area of negative pressure at the restricted portion 92a. A port 102 in the side wall of the fitting 92 at the venturi 100 communicates the fitting 92 with a seed drop inlet 104 projecting upwardly from the fitting 92 and communicating with the singulating chamber 50. The specific location of the seed drop inlet 104 is important with respect to receiving the metered seeds from the metering discs within the chamber 50 as will subsequently be described.

The metering device 42 further includes a bank or stack of metering discs 106 and valve plates 108 within the singulating chamber 50. The discs 106 are fixed to a common mounting shaft 110 and are disposed at regularly spaced locations along the length of the latter. The valve plates 108 are interspersed between adjacent discs 106 and correspond in number to the discs 106.

Each disc 106 comprises a flat circular plate of nylon material having a hexagonal mounting hole 112 in the center for matingly receiving the hexagonal mounting shaft 110. This hexagonal relationship enables the shaft 110 to impart driving rotation to the discs 106 during operation.

Each of the discs 106 has a circumferentially extending, marginal periphery 114 that presents an outermost, radially outwardly facing, notched edge 116. A circumferentially extending series of seed cups 118 are formed in the edge 116 so as to present a saw tooth-like configuration for the edge 116 with the cups 118 being defined between successive pairs of teeth 120. Each cup 118 has an arcuately concave seat 122 extending generally the full width of the edge 116, a normally trailing rear wall 124 leading substantially radially outwardly from the seat 122 to the edge 116, and a forwardly inclined leading wall 126 extending obliquely out to the outer edge 116 at a much shallower angle than the trailing wall 124. The leading wall 126 is beveled on both of its opposite lateral sides to present relief bevels 128 and 130 that converge to the leading wall 126 and make it fairly thin and sharp compared to the wide seat 122.

Figures 14, 15, 16, 17, 18, 19:
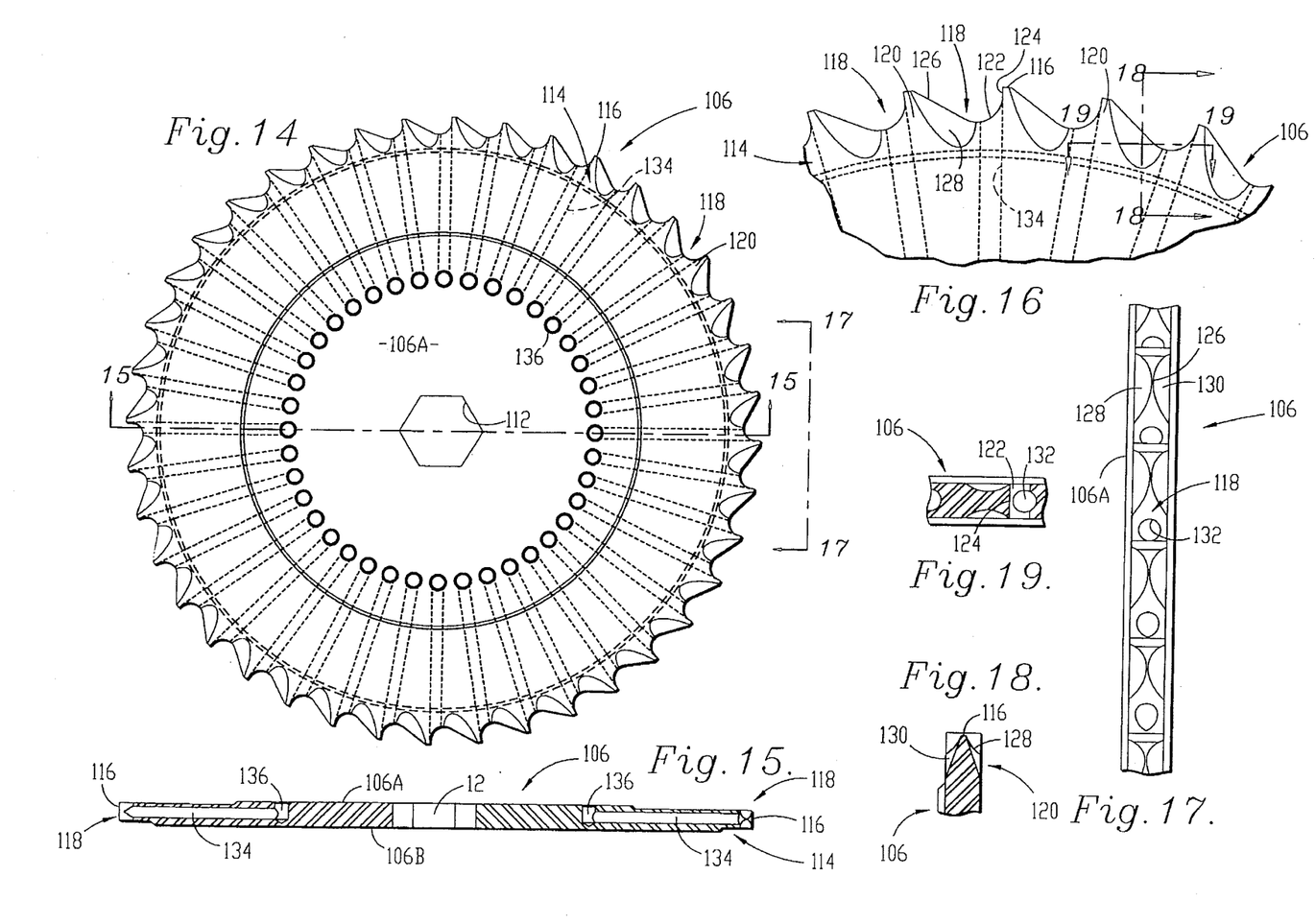
FIG. 14 is a plan view of one of the metering discs.
FIG. 15 is a transverse cross-sectional view through the disc taken substantially along line 15—15 of FIG. 14.
FIG. 16 is an enlarged, fragmentary elevational view of the marginal edge region of the disc.
FIG. 17 is an enlarged, fragmentary edge elevational view of the disc taken substantially along line 17—17 of FIG. 14.
FIG. 18 is a fragmentary cross-sectional view of the edge taken substantially along line 18—18 of FIG. 16.
FIG. 19 is a fragmentary cross-sectional view of the marginal portion of the disc taken substantially along line 19—19 of FIG. 16.

Each seat cup 118 has an orifice 132 in the seat 122. The orifice 132 is connected with a radial passage 134 leading radially inwardly toward the central axis of the disc and terminating at a transversely opening port 136 in one face 106a of the disc. Thus, as shown in FIG. 14 in particular, a circular series of ports 136 is presented which circumscribes the axis of rotation of the disc 106, each individual port 136 communicating a passage 134 with an outer orifice 132 at a corresponding Seed cup 118. The opposite face 106b of the disc 106 (FIGS. 6 and 8) is smooth and flat without ports.

Each of the upstanding valve members 108 is in the nature of a generally flat plate secured at its bottom edge 108a to the floor 48d of the metering body 48. Each plate member 108 is also secured along its rear edge 108b to the rear wall 48c of the metering body 48. Thus, the plates 108 remain stationary during rotation of the metering discs 106.

Figure 6:
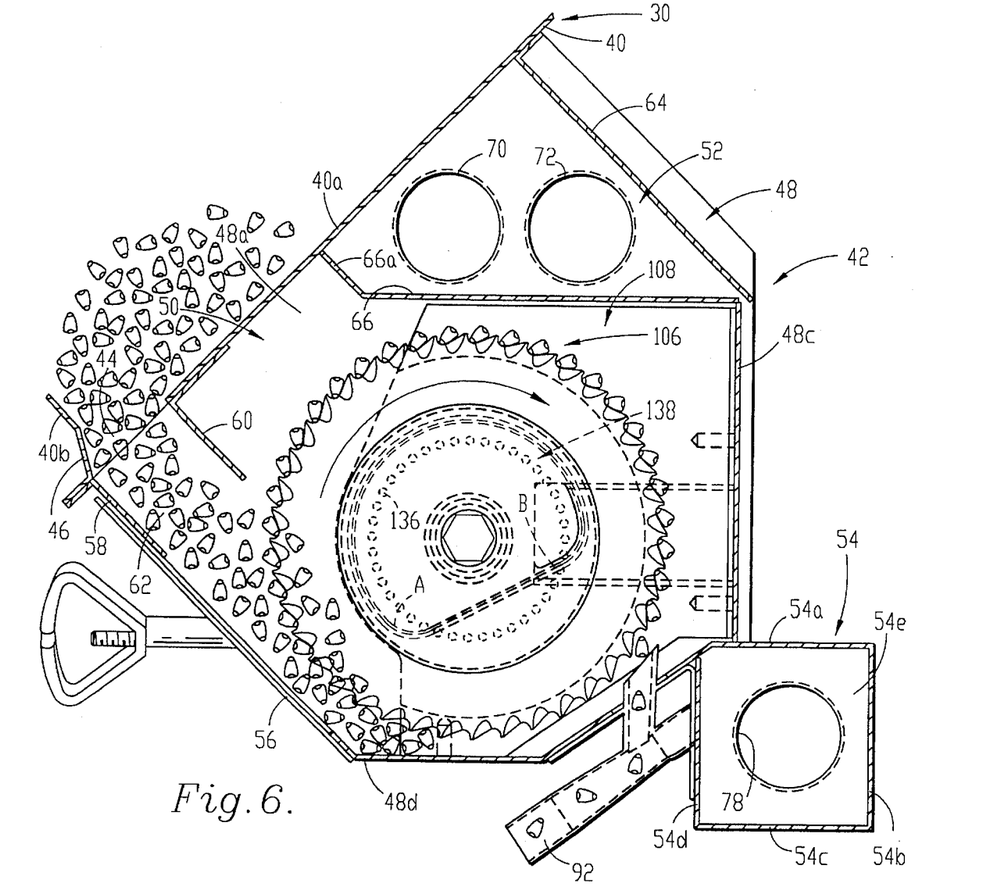
FIG. 6 is an enlarged vertical cross-sectional view through the metering device illustrating details of construction.
Figure 12:
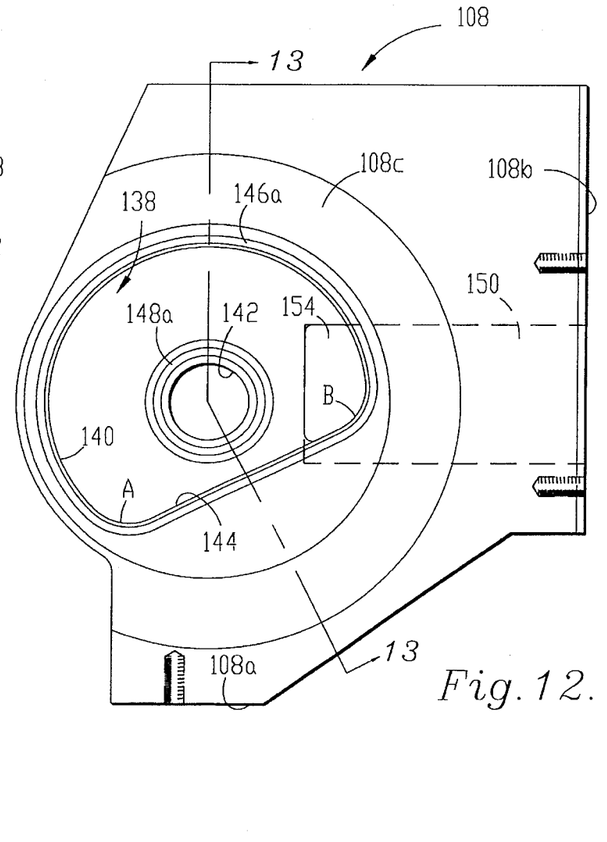
FIG. 12 is a side elevational view of the control plate.
Figure 13:
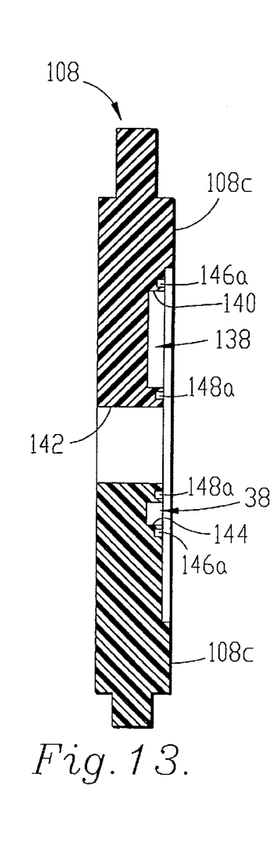
FIG. 13 is a transverse cross-sectional view through the control plate taken substantially along line 13—13 of FIG. 12.

Each of the valve plates 108 has an operating face 108c that is in opposed relationship with the face 106a of the adjacent disc 106. The face 108c contains structure that cooperates with the face 106a during rotation of the disc 106. Specifically, it will be seen that the face 108c of each valve plate 108 has a generally kidney shaped recess 138 having a concentric peripheral wall 140 that extends from an approximate 8 o'clock position relative to the axis of a central hole 142 to an approximate 4 o'clock position. A diagonal non-concentric wall 144 associated with the recess 138 interconnects the wall 140 between the 8 o'clock and 4 o'clock positions thereof, such 8 o'clock and 4 o'clock positions being respectively identified by the letters "A" and "B" in FIGS. 6, 11 and 12. A kidney shaped, resilient seal 146 associated with the outline of the recess 138 projects outwardly beyond the face 108c and into wiping engagement with the face 106a of the cooperating disc 106 (in FIGS. 12 and 13, only the groove 146a for seal 146 is illustrated). As shown in FIG. 6, the radius of the recess wall 140 from point A around to point B in a clockwise direction exceeds the radius of the circle of ports 136 such that the ports are in communication with the recess 138 from point A to point B. On the other hand, from point B to point A, the ports 136 pass outside the recess 138 below the recess wall 144 and are out of communication with the recess 138. A circular sealing bead 148 circumscribing the hole 142 projects outwardly beyond the plane of the face 108c to maintain wiping engagement with the face 106a of the disc 106 in the vicinity of the hole 142 through the plate 108 (in FIGS. 12 and 13, only the groove 148a for the bead 148 is illustrated). This use of the two seals 146 and 148 has the effect of sealing the recess 138 against the escape of pressurized air to the atmosphere at the operating interface between the disc 106 and the plate valve 108.

Figure 11:
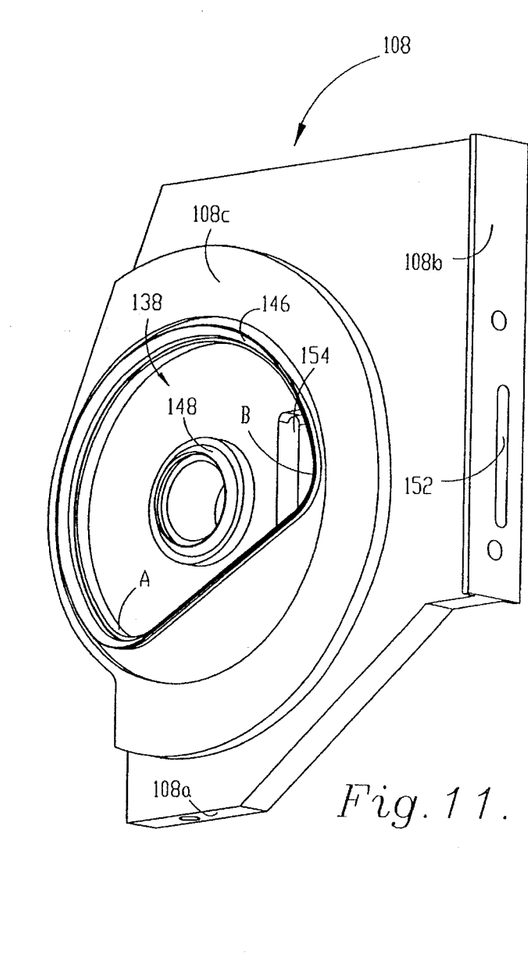
FIG. 11 is a left rear isometric view of one of the air flow control plates.

The recess 138 has a pressurized air outlet passage 150 that opens into the passage in the vicinity of point B and leads rearwardly from that location to the back edge 108b of the plate where it defines an exhaust outlet 152 as illustrated in FIG. 11. The opening 154 for the outlet passage 150 is a generally rectangular opening in the side wall 146 of the recess that intersects slightly with and forms a depression in adjacent regions of the floor of the recess 138. The exhaust outlets 152 of the valve plates 108 are disposed in registration with corresponding exhaust outlets 156 in the rear wall 48c of the metering body.

The mounting shaft 110 for the metering disc 106 projects outwardly through and beyond the side wall 48b of the metering body 48 as illustrated in FIGS. 3 and 4. At that location, the shaft 110 carries a driven sprocket 158 that is entrained by a drive chain 160. The drive chain 160 is also back wrapped around the sprocket 162 of an input drive shaft 164 so that the two shafts 110 and 164 are driven in mutually opposite directions. A pair of idler sprockets 166 and 168 keep tension on the chain 160.

Figure 7:
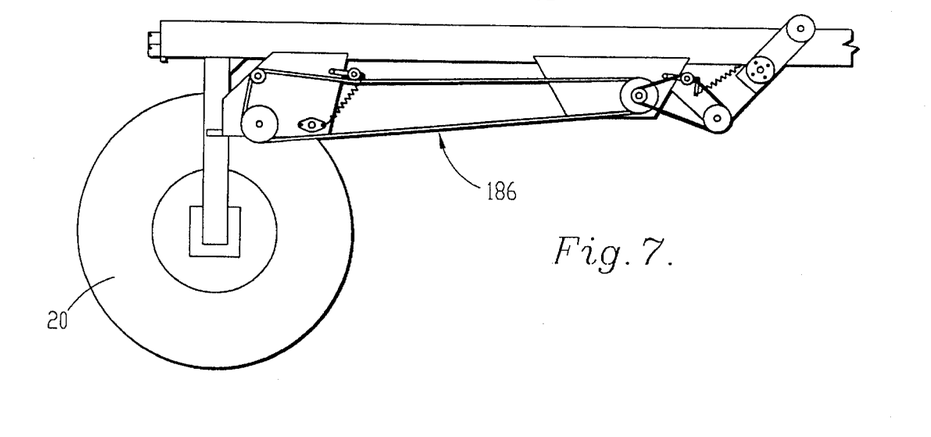
FIG. 7 is a fragmentary elevational view of the mobile bulk supply carrier showing the means by which the ground driven rotation of a rear wheel on the machine is transferred to the metering device.

The input drive shaft 164 has a driven sprocket 170 at its outermost end which is entrained by a chain 172 leading downwardly to a sprocket 174 (FIG. 5) on the interior surface of the cart frame 24. The sprocket 174 is fixed to a stub shaft 176 which also carries a larger sprocket 178. The larger sprocket 178 is entrained by a chain 180 which also entrains a sprocket 182 on a shaft 184. The shaft 176, sprocket 178, chain 180, sprocket 182 and shaft 184 comprise part of a transmission for permitting the operator to change the speed of rotation of the Seed metering discs. The driving input power to the transmission is provided by engagement of one of the ground wheels 20 with the ground as shown in FIG. 7, whereupon such motion is transmitted forwardly to the transmission via a chain and sprocket drive assembly 186 in FIG. 7.

Operation

As the air seeder is pulled across the field in accordance with the arrangement of FIG. 1, the cart 14 may be utilized in such a manner as to supply corn seed alone, or both fertilizer from the tank 26 and corn seed from the tank 30. It will be noted in this respect that the second, third and fourth ranks of openers on the cultivator 12 are located between the front row of corn seed openers 16 such that fertilizer would not be placed in the same row as the corn seed, but rather on both opposite sides thereof. As another alternative, the corn tank 30 may be completely disabled and left empty while the tank 28 is utilized to meter and distribute small cereal grain seeds such as wheat, oats and barley. This gives the farmer considerable flexibility and significant efficiencies in the use of his equipment since the same equipment can be used for many different purposes with only slight modifications.

Figure 8:
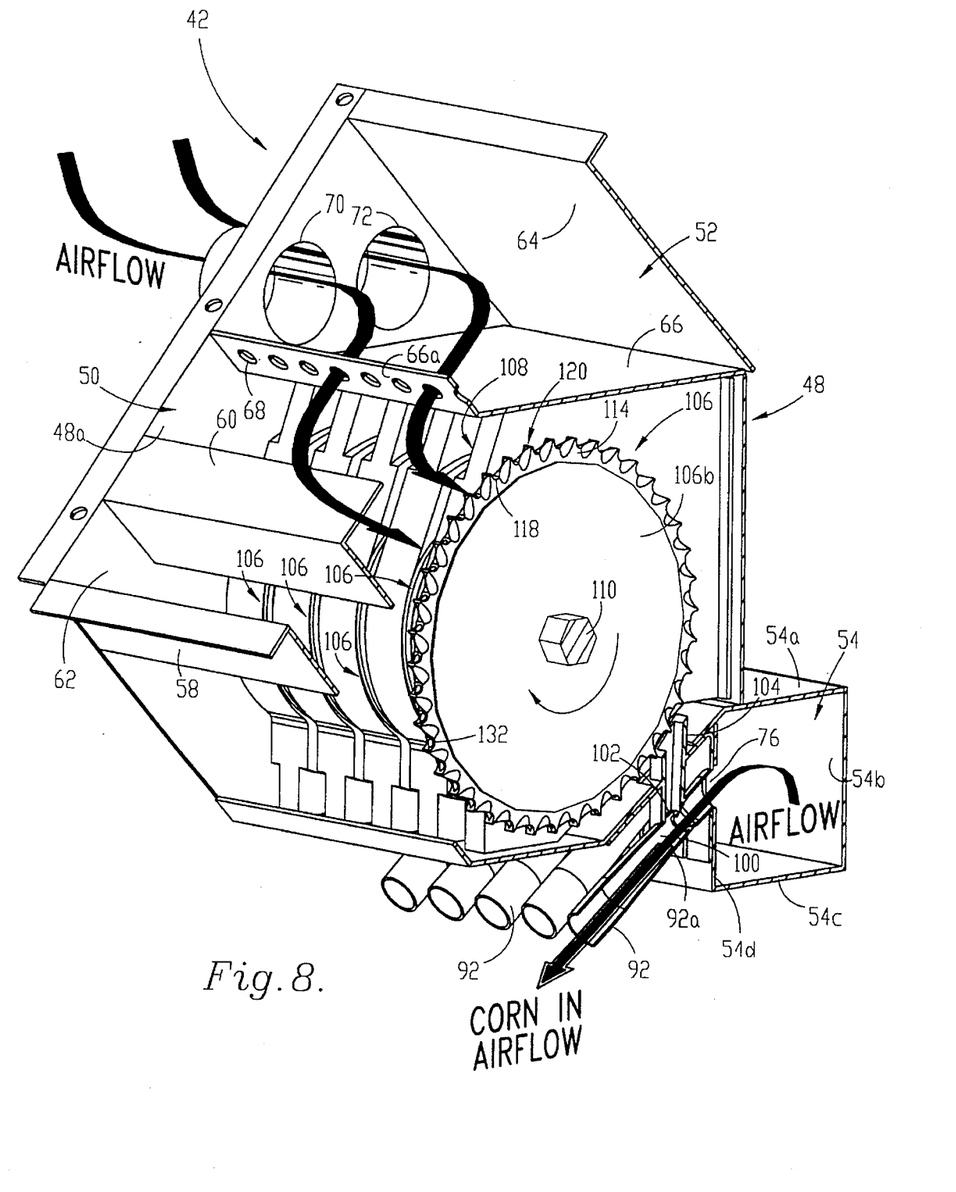
FIG. 8 is a left front perspective view of the metering device taken from approximately the same angle as FIG. 4 and having the near side wall removed to reveal interior details of construction.
Figure 9:
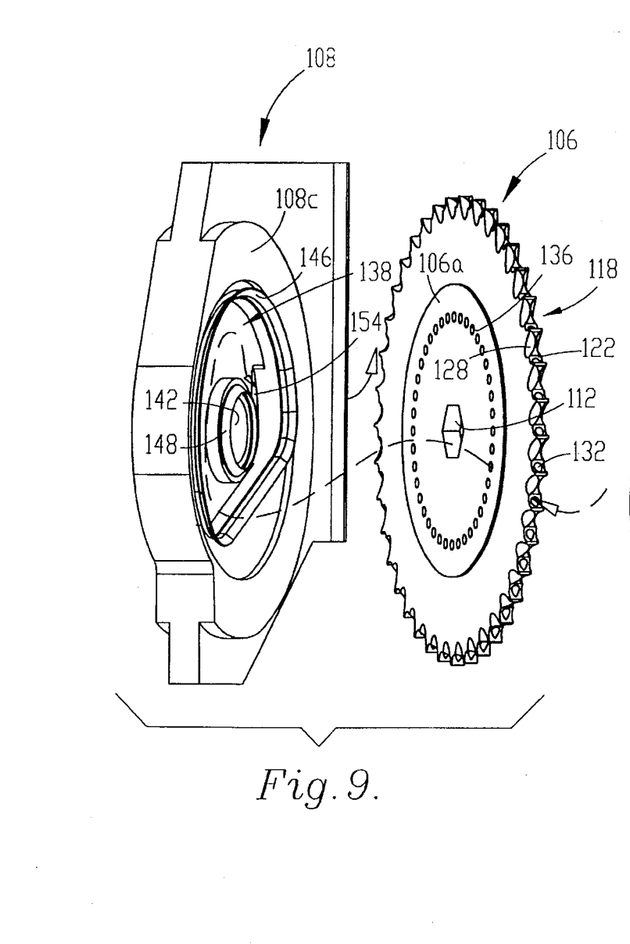
FIG. 9 is an illustration of one of the seed metering discs and its associated air flow control plate.
Figure 10:
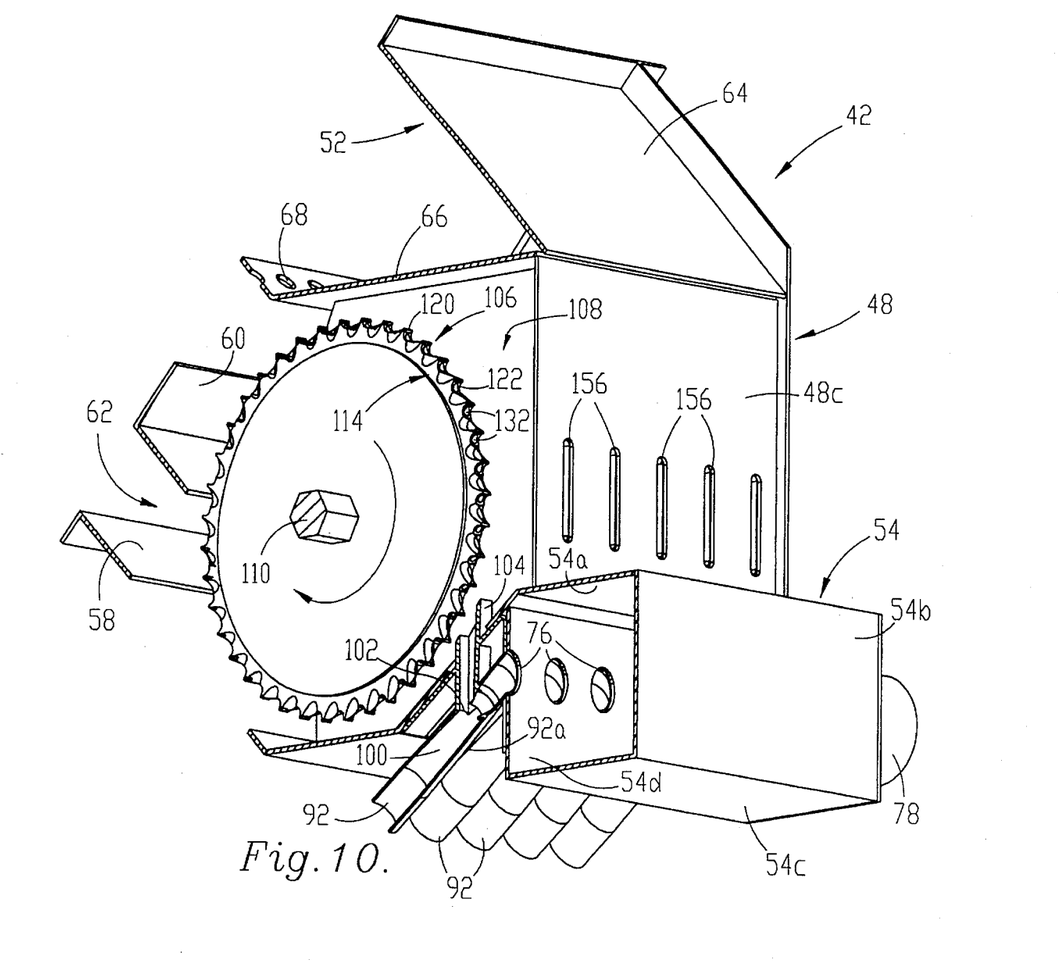
FIG. 10 is a left rear isometric view of the metering device with the left end wall removed as in FIG. 8 to reveal details of construction.

Assuming that the air seeding rig is to be utilized for corn planting, and without regard to whether or not fertilizer will also be applied, it will be understood that the seed discs 106 all rotate in unison and in a clockwise direction viewing FIG. 6, 8 and 10 as the cart 14 moves along the ground. Positive pressure air is directed into the plenum chamber 52 via inlets 70, 72 and 90 so as to pass through the inlet holes 68 and enter the singulating chamber 50. Consequently, the pressurized air finds its way up into the corn tank 30 through the seed inlet 62 of the metering body and the seed outlet 44 of the corn tank 30. The tank 30 is thereby pressurized.

Because of the location of the seed inlet 62 and the sloping front door 56, the corn seeds which filter down into the singulating chamber 50 do not fill the chamber 50 but instead only accumulate to a relatively shallow level along the lower front extremity of the chamber. Thus, each disc 106 rotates through the collection of corn seeds only during a relatively small portion of its path of travel from the 6 o'clock position to approximately the 9 o'clock position, and the corn seeds tend to stay well below the axis of rotation of the discs 106.

As the discs 106 sweep upwardly through the accumulation of seeds, the cups 118 capture one seed per cup and carry the seeds upwardly out of the collection. Due to the pressurized nature of the singulating chamber 50, the orifices 132 in the seed cubs 118 are admitting pressurized air during the same time that the cups are sweeping through the seeds, such that, in addition to the purely mechanical capturing of the seeds by the cups, the seeds are directed into the cups and against their seats 122 by positive air pressure. Even as the seeds are settling into their seats 122, air is entering the orifices 132 around the edges of the seeds in order to ultimately reach the exhaust outlets 156 at the back of the metering body 48 via the outlet passages 150 and the recess 138 in the plates 108, and the ports 136 and passages 134 and the discs 106. Once the seeds are fully seated within their cups, they tend to block the air flow, but even then, some air creeps around the seeds and into the passages 134 to keep the seeds pressed firmly against the edges of the discs.

Each picked up seed is carried by its cup 118 around the path of travel of the disc as long as the port 136 associated with that particular seed remains within the recess 138. This is from point A to point B in FIG. 6. Once point B is reached, the ports 136 between point A and point B are not allowed to exhaust their air through the recess 138 and, consequently, there is no air pressure to hold the seeds in place as their cups 118 become inverted around the lower right hand portion of the path of travel of the disc. Consequently, as illustrated in FIG. 6, the seeds are released from the discs 106 at a point in the circular path of travel of the periphery of the discs corresponding approximately to point B in the recess 138.

As a result of the venturi 100 established within each of the conduit fittings 92, a secondary air stream is induced in the seed drop inlets 104 which causes the seeds to be immediately sucked down into the inlets 104 as the seeds are released by the discs 106. The seeds are then immediately drawn into the conveying air stream within the fittings 92 and are propelled by those powerful streams to the openers 12 via the conduits 94.

It will be appreciated that the singulated seeds are thus dropped from the discs 106 at regular, spaced intervals and that such spacing is maintained as they are drawn down into the primary conveying air stream within the conduits 94. Ideally, the upper ends of the seed drop inlets 104 are positioned in close proximity to the point of release of the seeds from the discs 106 such that the opportunity for errant behavior by the released seeds is held to a minimum. The goal in this respect is to avoid any turbulence in the release area of the seeds, or anywhere downstream from that point, so that smooth, orderly flow of the seeds is assured and that even spacing of the seeds is maintained. Such maintenance of even spacing is important not only at the point of release from the metering discs 106, but at all points along the path of travel of the seeds to the openers 16, all of which is greatly enhanced by the venturi action available from the special conduit fittings 92.

Thus, it will be seen that the seed metering and distribution device 42 of the present invention is especially well suited to apply air seeding technology to corn planting. Instead of metering a solid flow of seeds to the air stream as in conventional air seeding drills for wheat and oats, for example, the present invention carefully singulates each seed from the bulk supply tank and then maintains good control over that seed as it is released from its mechanical handling means and turned over to the air conveyance means. During the critical transition time between release from the metering discs and entry into the primary conveying air stream, order, control and uniform spacing are maintained by the venturi-induced secondary air streams. The seeds never have an opportunity to linger around the seed drop inlets 104 before actually entering such structures.

It is to be noted that due to the horizontal "stacking" of the discs 106 on the mounting shaft 110, the number of "runs" of conduits 94 or rows of seeds planted can be readily adjusted by the manufacturer without appreciably increasing the space required by the metering body 48. It is only necessary to add the appropriate number of discs 106 and valve plates 108 to arrive at the final number of desired rows. Although the width of the metering body 42 may be increased to some extent, the vertical dimensions of the body will not, and the diameter of the discs likewise does not need to be increased. Furthermore, because the seed cups 118 are located around the outermost edge of the disc 106, instead of being located inside of a hollow drum or the like as is disclosed in certain prior art devices, a significant number of additional seed cups or cups can be obtained for any one given diameter. Among other things, this means that, for the same diameter of metering device, more seed capacity is available such that additional seeds per acre can be planted. From an alternative perspective, the same seed capacity can be obtained with a smaller diameter disc, thus providing significant space-saving benefits.

It should also be pointed out that the unique configuration of the notched discs 106 with the aggressive "teeth" is particularly beneficial in assuring that seeds will in fact be picked up by the discs as they rotate within the singulating chamber 50. At the same time, more than one seed per cup is discouraged because of the double beveled nature of the leading edge of each seed cup which simply eliminates surface area for a second seed to cling to. Thus the rate of feeding "doubles" can be held in check.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

We claim:

1. In a seed metering device for separating a bulk quantity of seeds into several separate streams, each stream containing seeds traveling at regular spaced intervals, the improvement comprising:

a receiving chamber for receiving and collecting a supply of seeds to be separated;

a bank of side-by-side metering discs mounted for rotation about a common axis, each of said discs having a marginal periphery movable within said chamber during at least a portion of the circular path of travel of the disc for exposing said periphery to the supply of seeds in the chamber, each of said discs having a circumferential series of seed cups spaced around its marginal periphery for receiving and temporarily retaining seeds from the supply as the discs rotate;

a structure for maintaining pressure at the seed cups as they move through said chamber and for a time thereafter whereby to encourage seeds to stay in their cups until the pressure is terminated, said structure further being operable to terminate said pressure at a certain point in the path of travel of each cup whereby to cause the seeds of each disc to drop from their cups at spaced intervals;

a plurality of transfer conduits disposed for intermittently receiving seeds from corresponding ones of the discs, there being a conduit for each disc; and means for generating a stream of pressurized air within each of said conduits for conveying the seeds of that conduit to a point of delivery while maintaining their mutually spaced relationship.

2. In a seed metering device as claimed in claim 1, said structure for maintaining and terminating pressure at the seed cups including passage means in each disc communicating with the cups, said discs being spaced apart along said axis, said structure further including a series of stationary, spaced apart control members alternately interspersed between the discs and having portions disposed to cooperate with said passage means of an adjacent disc during rotation of the discs to cause said maintaining and terminating of pressure.

3. In a seed metering device as claimed in claim 2, each member and an adjacent disc having mutual opposed, oppositely directed faces, said portion of the member cooperating with said passage means of the disc comprising a recess in the face of the disc communicating with air exhaust outlet, said passage means in the disc including a circular series of ports arranged about said axis of rotation and communicating with respective ones of the cups, said recess and said ports being so disposed as to connect, maintain and then subsequently disconnect each successive port from the exhaust outlet as the disc rotates through its path of travel.

4. In a seed metering device as claimed in claim 3, each member having a sealing element circumscribing said recess and disposed in willing engagement with the face of the adjacent disc during rotation of the disc to prevent air escape.

5. In a seed metering device as claimed in claim 1, said transfer conduits being provided with venturi structure for creating an induced secondary airstream for drawing the seeds into the conduits as they are dropped from the discs.

6. In a seed metering device as claimed in claim 5, said venturi structure including a separate venturi for each conduit, each of said conduits having an inlet disposed to receive seeds gravitating from the disc for that conduit and to direct the seeds into the airstream within the conduit.

7. In a seed metering device as claimed in claim 1, each of said discs having a radially outwardly facing edge at its marginal periphery, said cups being located in said edge.

8. In a seed metering device as claimed in claim 7, each of said cups comprising a radially outwardly opening notch in the edge having a concave seat, said seat having an orifice therein comprising part of said structure for maintaining pressure at the seed cups.

9. In a seed metering device as claimed in claim 8, each notch further having a normally leading front leg extending inwardly from said outermost edge to the front of the seat and a normally trailing rear leg extending inwardly from said outer-most edge to the rear of the seat, said front leg of the notch extending toward the seat at a more gradual angle than the rear leg.

10. In a seed metering device as claimed in claim 9, said front leg of each notch having a pair of oppositely disposed, converging surfaces that cause said front leg of the notch to be thinner than said seat and said rear leg of the notch.

11. In a seed metering device as claimed in claim 10, said front leg of each notch intersecting at said outer edge of the disc a short circumferential distance from the intersection of the rear leg of the next successive notch with the outer edge of the disc whereby to present a circumferential series of radially outwardly projecting teeth around the disc with said notches disposed between adjacent teeth.

12. In a seed metering device as claimed in claim 11, said structure for maintaining and terminating pressure at the seed cups including passage means in each disc communicating with the orifices in said cups, said discs being spaced apart along said axis, said structure further including a series of stationary, spaced apart control members alternately interspersed between the discs and having portions disposed to cooperate with said passage means of an adjacent disc during rotation of the discs to cause said maintaining and terminating of the pressure.

13. In a seed metering device as claimed in claim 12, each member and an adjacent disc having mutually opposed, oppositely directed faces, said portion of the member cooperating with said passage means of the disc comprising a recess in the face of the disc communicating with an exhaust outlet, said passage means in the disc including a circular series of ports arranged about said axis of rotation and communicating with respective ones of the orifices, said recess and said ports being so disposed as to connect, maintain and then subsequently disconnect each successive port from the exhaust outlet as the disc rotates through its path of travel.

14. In a seed metering device as claimed in claim 3, said transfer conduits being provided with venturi structure for creating an induced secondary airstream for drawing the seeds into the conduits as they are dropped from the discs.

15. In a seed metering device as claimed in claim 14, said venturi structure including a separate venture for each conduit, each of said conduits having an inlet disposed to receive seeds released from the disc for that conduit and to direct the seeds into the airstream within the conduit.

16. In a seed metering device as claimed in claim 4, each member further having a hole therethrough for rotatably receiving a drive shaft for the discs, said hole being located within said recess, each member further having a sealing bead circumscribing said hole and disposed for wiping engagement with the face of the adjacent disc during rotation of the disc to define a pressure chamber within the recess and between the element and the bead during rotation of the disc.

17. In a seed metering device as claimed in claim 16, said recess of each member having a floor, said floor having an orifice communicating with said exhaust outlet.

* * * * *